(12) United States Patent
MarapaReddy et al.

(10) Patent No.: US 11,435,719 B2
(45) Date of Patent: Sep. 6, 2022

(54) SYSTEM AND METHOD FOR IDENTIFYING MANUFACTURING DEFECTS

(71) Applicant: Samsung Display Co., Ltd., Yongin-si (KR)

(72) Inventors: Sai MarapaReddy, Newark, CA (US); Shuhui Qu, Fremont, CA (US); Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 349 days.

(21) Appl. No.: 16/693,101

(22) Filed: Nov. 22, 2019

(65) Prior Publication Data

US 2021/0096530 A1    Apr. 1, 2021

Related U.S. Application Data

(60) Provisional application No. 62/907,433, filed on Sep. 27, 2019.

(51) Int. Cl.
| | | |
|---|---|---|
| *G06F 9/44* | (2018.01) | |
| *G06F 9/445* | (2018.01) | |
| *G06F 9/455* | (2018.01) | |
| *H04L 29/08* | (2006.01) | |
| *G05B 19/418* | (2006.01) | |

(Continued)

(52) U.S. Cl.
CPC .............. *G05B 19/406* (2013.01); *G06N 3/08* (2013.01); *G05B 2219/39315* (2013.01)

(58) Field of Classification Search
CPC ........ G06K 9/627; G06N 3/0454; G06N 3/08; G06N 3/084; G06N 20/00; G06T 2207/20084; G05B 19/406; G05B 2219/39315; G05B 19/4183; Y02P 90/02
See application file for complete search history.

(56) References Cited

U.S. PATENT DOCUMENTS

| | | |
|---|---|---|
| 6,988,225 B1 | 1/2006 | Purdy et al. |
| 10,068,171 B2 | 9/2018 | Wshah et al. |

(Continued)

FOREIGN PATENT DOCUMENTS

| | | |
|---|---|---|
| KR | 10-1688458 B1 | 12/2016 |
| KR | 10-1822963 B1 | 1/2018 |
| KR | 10-1941585 B1 | 1/2019 |

OTHER PUBLICATIONS

Tello et al., Deep-Structured Machine Learning Model for the Recognition of Mixed-Defect Patterns in Semiconductor Fabrication Processes, 8 pages (Year: 2018).*

(Continued)

*Primary Examiner* — Thuy Dao
(74) *Attorney, Agent, or Firm* — Lewis Roca Rothgerber Christie LLP

(57) ABSTRACT

A system and method for classifying products manufactured via a manufacturing process. A processor receives an input dataset, and extracts features of the input dataset at two or more levels of abstraction. The processor combines the extracted features and provides the combined extracted features to a classifier. The classifier is trained based on the combined extracted features for learning a pattern of not-faulty products. The trained classifier is configured to receive data for a product to be classified, to output a prediction for the product based on the received data.

20 Claims, 6 Drawing Sheets

(51) Int. Cl.
*G05B 19/406* (2006.01)
*G06N 3/08* (2006.01)

(56) References Cited

U.S. PATENT DOCUMENTS

| | | | | |
|---|---|---|---|---|
| 10,504,020 | B2* | 12/2019 | Trenholm | G06N 3/0454 |
| 2017/0193400 | A1 | 7/2017 | Bhaskar et al. | |
| 2019/0188840 | A1* | 6/2019 | Kwon | G06K 9/627 |
| 2019/0197358 | A1 | 6/2019 | Madani et al. | |
| 2020/0173933 | A1* | 6/2020 | Tada | G01N 21/9515 |
| 2020/0310400 | A1* | 10/2020 | Jha | G05B 23/0283 |

OTHER PUBLICATIONS

Zheng, P., et al., "One-Class Adversarial Nets for Fraud Detection," (2018), 10 pages, https://arxiv.org/abs/1803.01798.

Simonyan, K., et al., "Very deep Convolutional Networks for Large-Scale Image Recognition," (2014), 14 pages, https://arxiv.org/abs/1409.1556.

Anonymous Authors, A conference paper at ICLR 2019, "A Multi-Modal One-Class Generative Adversarial Network for Anomaly Detection in Manufacturing", https://openreview.net/forum?id=HJI1ujCct7, 11pgs, Sep. 28, 2018.

Ferguson, Max, et al., "Detection and Segmentation of Manufacturing Defects with Convolutional Neural Networks and Transfer Learning," Smart and Sustainable Manufacturing Systems, vol. 2, No. 1, Sep. 2018, 15 pages.

Han, Guang, et al., "Feature Fusion and Adversary Occlusion Networks for Object Detection," IEEE Access, vol. 7, 2019, pp. 124854-124865.

Liu, Yu, et al., "Fusion that matters: convolutional fusion networks for visual recognition," Multimedia Tools and Applications, vol. 77, Feb. 2018, pp. 29407-29434.

EPO Extended European Search Report dated Mar. 1, 2021, issued in corresponding European Patent Application No. 20189035.7 (12 pages).

* cited by examiner

SYSTEM AND METHOD FOR IDENTIFYING MANUFACTURING DEFECTS

CROSS-REFERENCE TO RELATED APPLICATION(S)

The present application claims priority to and the benefit of U.S. Provisional Application No. 62/907,433, filed Sep. 27, 2019, entitled "SYSTEM AND METHOD TO IDENTIFY MANUFACTURING TRACE DATA DEFECTS," the entire content of which is incorporated herein by reference.

FIELD

One or more aspects of embodiments according to the present disclosure relate to classifiers, and more particularly to a system and method for training a machine learning (ML) classifier to identify manufacturing defects where the available training data is imbalanced.

BACKGROUND

The mobile display industry has grown rapidly in recent years. As new types of display panel modules and production methods are being deployed, surface defects have been harder to inspect using just traditional mechanisms. It would be desirable to employ artificial intelligence (AI) to automatically predict whether a manufactured display panel module is faulty or not (e.g. classified as "no good" or "good"). In fact, it would be desirable to employ AI to predict defects in other hardware products, and not just display panel modules.

An AI/ML model that can generalized well to new, previously unseen data would be suitable for such a task. However, generating such a model is hard when the training dataset is highly imbalanced and consists of two classes (e.g. "good" and "no good"). Due to the imbalanced nature of the dataset, there are not enough samples available for training both classes to achieve high accuracy for both of the classes.

Thus, there is a need for an improved system and method for building an AI/ML model steadily and stably from a limited amount of training data that is imbalanced over a binary class.

SUMMARY

Embodiments of the present disclosure are directed to a method for classifying products manufactured via a manufacturing process. A processor receives an input dataset, and extracts features of the input dataset at two or more levels of abstraction. The processor combines the extracted features and provides the combined extracted features to a classifier. The classifier is trained based on the combined extracted features for learning a pattern of not-faulty products. The trained classifier is configured to receive data for a product to be classified, to output a prediction for the product based on the received data.

In one embodiment, the processor reduces dimensionality of the extracted features, where the combined extracted features are features of reduced dimensionality.

In one embodiment, the extracting of the features includes invoking a pre-trained neural network, and extracting features from selected layers of the pre-trained neural network.

In one embodiment, the pre-trained neural network is a deep convolutional network having a plurality of convolutional layers, where the extracted features are from two or more of the convolutional layers, each of the two or more of the convolutional layers providing a different level of abstraction of the input dataset.

In one embodiment, the two or more of the convolutional layers are no more than ten layers from an input layer.

In one embodiment, the combining of the extracted features includes concatenating the extracted features for generating a combined set of features.

In one embodiment, the classifier is a generative adversarial network that is iteratively trained with not-faulty products for learning a pattern of the not-faulty products.

In one embodiment, the classifier includes a generator and a discriminator, wherein the generator is configured to generate samples of faulty products for training the discriminator for distinguishing between the faulty and not-faulty products.

In one embodiment, the prediction is a prediction of the product as being faulty or not faulty.

Embodiments of the present disclosure are also directed to a system for classifying products manufactured via a manufacturing process. The system includes a processor and memory, where the memory has stored therein instructions that, when executed by the processor, cause the processor to: receive an input dataset; extract features of the input dataset at two or more levels of abstraction; combine the extracted features; provide the combined extracted features to a classifier; and train the classifier based on the combined extracted features for learning a pattern of not-faulty products, the trained classifier being configured to receive data for a product to be classified, to output a prediction for the product based on the received data.

Embodiments of the present disclosure are further directed to a system for classifying manufactured parts as good or faulty. The system includes a data collection circuit configured to collect an input dataset. The system further includes a processing circuit coupled to the data collection circuit. The processing circuit has logic for: receiving an input dataset; extracting features of the input dataset at two or more levels of abstraction; combining the extracted features; providing the combined extracted features to a classifier; training the classifier based on the combined extracted features for learning a pattern of not-faulty products, the trained classifier being configured to receive data for a product to be classified, to output a prediction for the product based on the received data.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
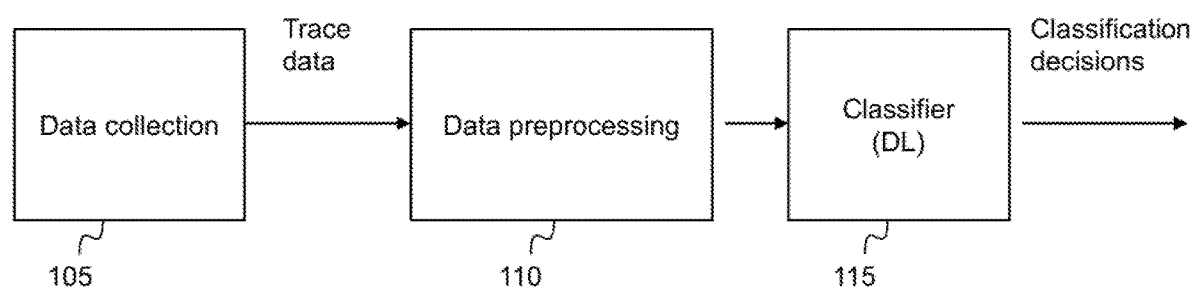
FIG. 1 is a system for classifying parts as faulty or not faulty according to one exemplary embodiment.

The detailed description set forth below in connection with the appended drawings is intended as a description of exemplary embodiments of a system and method for data augmentation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A manufacturing process, such as a mobile display manufacturing process, may acquire digital trace data during the manufacture of the mobile display product. Although a mobile display product is used as an example, a person of skill in the art should recognize that embodiments of the present disclosure may apply to manufacturing processes of other glass and non-glass products, including for example, the manufacturing of wafer and semiconductor glass.

Trace data is collected via one or more sensors that may be placed, for example, on top of a conveyer belt that carries the product during production. The sensors are configured to record any sensed activity as trace data. The sensors may be, for example, multiple temperature and pressure sensors configured to capture measurements of temperature and pressure in the manufacturing process, as a function of time. Each sensor may be sampled multiple times (e.g., every second or a few seconds for monitoring each glass, over a period of multiple glass manufacturing time).

It is desirable to analyze the trace data automatically using a classifier to predict faulty ("no good") manufactured products from not-faulty ("good") products. The classifier thus needs to be trained to assign the data samples to one of two classes—"good" and "no good." There may be, however, a significant imbalance in the training data used to train such a classifier. For example, in the manufacturing process for manufacturing electronic parts, it may be the case that the majority of the parts are acceptable, or "good," and a small minority of the parts are in some way faulty, or "no good." The number of "good" parts may outnumber the number of bad parts by a factor ranging from 5 to 15. For this reason, when data is obtained during the manufacturing and testing process, most of the data may be from good devices, causing an imbalance in the training data.

Embodiments of the present disclosure generate a deep learning ML model that addresses the issues of class imbalance in the labeled dataset. According to various embodiments, raw trace data is transformed via feature extractions using a pre-trained model/neural network. The transformed data is then be used to train the deep learning ML model via transfer learning.

As a person of skill in the art should recognize, transfer learning is a technique where a neural network model that is trained on one problem (also referred to as a pre-trained model/neural network) is used to solve a second related problem. The one problem may be, for example, analyzing visual imagery, while the other related problem may be, as in the present embodiments, detecting faulty manufacturing parts. One benefit of transfer learning is that the time for training the new neural network for solving the second problem is reduced while resulting in lower generalization error. The pre-trained neural network that may be used for transfer learning, according to one embodiment, is a deep convolutional neural network that is trained for detecting objects in computer images, such as, for example, a deep convolutional network developed by Oxford's Visual Geometry Group (VGG). More details on the VGG network is provided in Karen Simonyan, et al., "Very deep Convolutional Networks for Large-Scale Image Recognition," (2014), available at https://arxiv.org/abs/1409.1556, the content of which is incorporated herein by reference.

In one embodiment, features of the input trace data are extracted according to different layers of the VGG network for the transfer learning. In one embodiment, the layers that are selected for the transfer learning are the layers closer to the original input to the VGG network. Such layers allow low-level features of the original input to be extracted (as opposed to mid- or high-level features that are extracted via mid- or high-level layers). The extracted features are, in some embodiments, in a high dimensional space (e.g. over 10000 features generated by 50 sensors). Thus, in some embodiments, dimensionality of the extracted features are reduced to a lower dimensional space (e.g. 300 features).

In one embodiment, the features that are extracted via the selected convolutional layers are combined to generate a combined set of features. The combined features are then used to iteratively train a generative adversarial network (GAN). In one embodiment, the network is a one class adversarial network that is trained to learn a pattern of not faulty (e.g. "good") products. Once trained, trace data of manufacturing products that deviates from the learned pattern of "good" products may be classified as "no good."

FIG. 1 is a system for classifying parts as faulty or not faulty according to one exemplary embodiment. In some embodiments the system includes one or more data collection circuit 105 (which may include, for example, temperature and pressure sensors, amplifiers, and/or analog to digital converters), a data preprocessing circuit 110 (which may reformat the data, as discussed in further detail below), and a classifier engine (which may generate a deep learning (DL) neural network).

The data preprocessing circuit 110 may receive raw trace data (e.g., a number of time traces, as mentioned above) from the data collection circuits 105 and may reformat the data into a 2D image format, e.g., into two dimensional arrays (e.g., 224×224 arrays). In one embodiment, the data preprocessing circuit 110 includes one or more data storage devices for storing the raw trace data. The size of the two dimensional arrays may be selected to be comparable to the size of images commonly classified by neural networks. The reformatting may then make it possible to reuse certain portions of the code implementing a neural network classifier of images, for use in some embodiments.

The reformatted input data is provided to the classifier engine 115 for training or making predictions via a DL neural network. In this regard, the classifier engine may be configured with logic or instructions stored on one more tangible, machine-readable media, that may be executed by one or more processing devices for generating, training, and performing predictions via the DL neural network.

Figure 2:
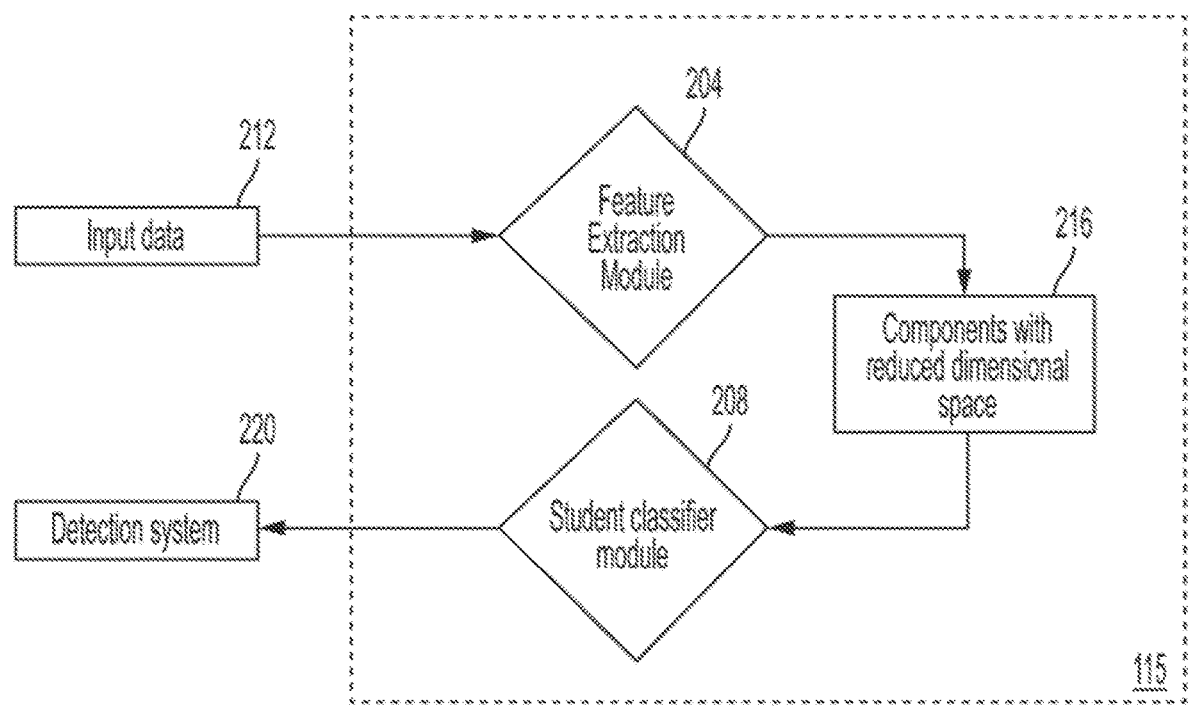
FIG. 2 is a conceptual block diagram of a classifier engine having a feature extraction module and a student classifier module according to one exemplary embodiment.

FIG. 2 is a conceptual block diagram of the classifier engine 115 according to one exemplary embodiment. In one embodiment, the classifier engine 115 includes a feature extraction module 204 and a student classifier module 208. The feature extraction module 204 may be configured with a pre-trained deep convolutional neural network such as, for example, the VGG network. Although the VGG network is used as an example of the pre-trained network that is employed by the feature extraction module, a person of skill in the art should recognize that there are other convolutional networks that may be used in lieu of the VGG network, such as, for example, DenseNet (Densely Connected Convolutional Networks), MobileNet, Inception network, or the like.

In one embodiment, the student classifier module 208 is configured learn a mathematical model (also referred to as a "student model") for separating faulty ("no good") products from not-faulty ("good") products. In one embodiment, the mathematical model is a generative adversarial network that is trained to learn a pattern of the not-faulty products. In one embodiment, the generative adversarial network is a one class adversarial network (OCAN). OCAN is described, for example, by Zheng et al., "One-Class Adversarial Nets for Fraud Detection" (2018), available at https://arxiv.org/abs/1803.01798, the content of which is incorporated herein by reference. In general terms, OCAN generates "no good" data samples with only given "good" data samples, enabling the trained model to better separate faulty (i.e. "not good") product from not-faulty (i.e. "good") products.

During training, a labeled input dataset 212 is received by the classifier engine 115 from the preprocessing circuit 110. The labeled input dataset 200 includes a first number of data samples (e.g., a few thousand data elements) each labelled "good," and a second number of data samples (e.g., between 10 and 100 data elements) each labelled "no good."

The dataset 212 is provided to the feature extraction module 204 for extracting features of the dataset at two or more levels of abstraction. The levels of abstraction are determined based on the convolutional layers of the pre-trained deep convolutional neural network that are selected for purposes of transfer learning. In one embodiment, the feature extraction module 204 is further configured to reduce dimensionality of the extracted features for reducing the spatial size of the representation. This allows for reduction in, for example, memory footprint, and the amount of computational resources used for training the OCAN.

The feature extraction module 204 is configured to combine the various extracted features to output combined components 216, which may then be used to train the OCAN. Once trained, the OCAN may be used by a detection system 220 to classify a newly manufactured product, using trace data acquired for the product, as "good" or "no good." In one embodiment, the detection system 220 may output a message or recommendation on an action to be taken if the product is predicted to be "no good." For example, the action may be to remove the faulty product for further testing, fixing, or discarding. Experiments show that the trained model will work steadily and within a threshold level of classification accuracy (e.g. accuracy of 90% or higher), for new trace data.

Figure 3:
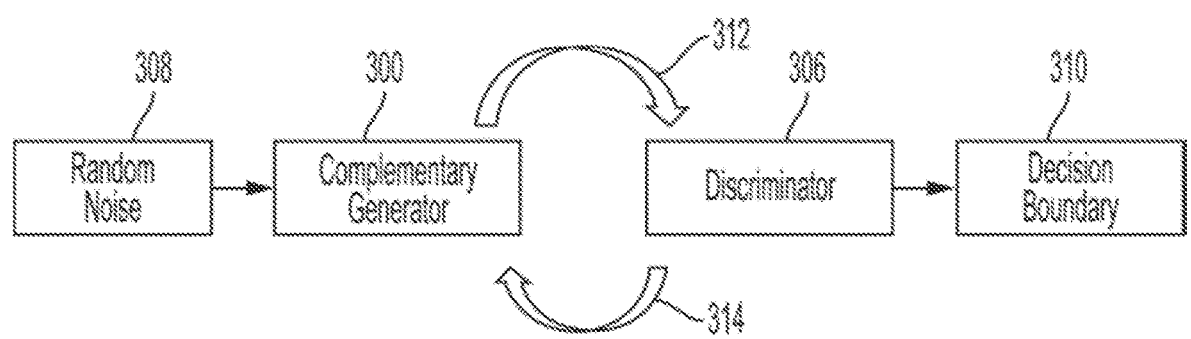
FIG. 3 is a more detailed schematic block diagram of the student classifier module of FIG. 2 according to one exemplary embodiment.

FIG. 3 is a more detailed schematic block diagram of the student classifier module 208 according to one exemplary embodiment. In one embodiment, the classifier module 208 includes a complementary generator 300 and a discriminator 306. Both the complementary generator and the discriminator may be implemented as neural networks. In a typical generative adversarial network, a generator takes both positive (e.g. "good") and negative (e.g. "no good") data samples to generate fake samples that is aimed to match the real input data. The complementary generator 300 according to the various embodiments, on the other hand, is configured to take only the positive (e.g. "good") data samples, and generate complementary (e.g. "no good") samples that are complementary to the positive samples. In one embodiment, the complementary samples are taken from different regions (but in the same space of user representations) than the learned regions of the positive samples.

In one embodiment, the complementary generator 300 generates the complementary samples from a random noise vector 308 (e.g. white Gaussian noise), and provides it to the discriminator 306 for training the discriminator to differentiate the real positive ("good") samples, from the complementary samples. In this regard, the discriminator 306 learns a decision boundary 310 for discriminating the positive samples from the complementary samples. The decision boundary may be described, for example, by a simple linear equation (e.g. a line) or a more complex higher-order polynomial (e.g. curve, circle, etc.).

As depicted via arrows 312 and 314, the complementary generator 300 and discriminator 306 are trained iteratively as competitors to each other by alternatively training the generator and the discriminator. In general terms, the goal of the complementary generator is to generate complementary samples that are in the low-density regions of the "good" samples. The goal of the discriminator is to separate the "good" samples from the generated complementary samples. Once trained, the discriminator may be employed as a classifier for identifying "no good" manufactured products by comparing manufacturing trace data for those products with the learned training pattern of "good" products. If the trace data of a particular manufactured product deviates from the learned pattern of "good" products, the particular product may be classified as "no good."

Figure 4:
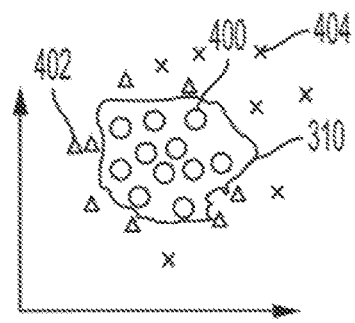
FIG. 4 is a graph of an example decision boundary that is learned by the student classifier module of FIG. 2 according to one exemplary embodiment.

FIG. 4 is a graph of an example of the decision boundary 310 that is learned by the OCAN from the iterative training of the complementary generator 300 and discriminator 306. The decision boundary 310 differentiates "good" training samples 400 from complementary samples 402 generated by the complementary generator 300. Once trained, the discriminator 306 may identify "no good" products based on trace data 404 of such products that localizes in regions other than the regions of the "good" samples 400.

Figure 5:
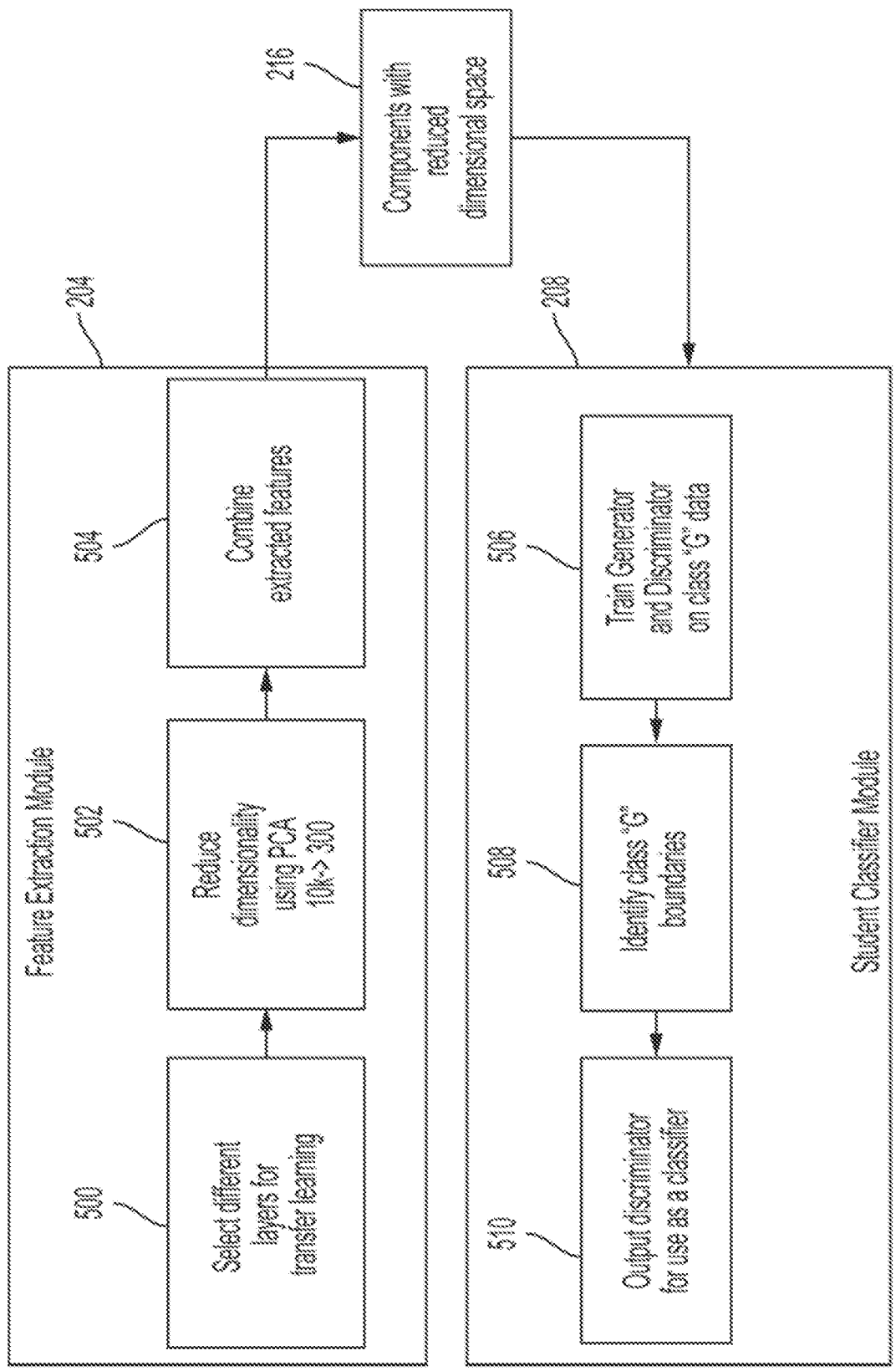
FIG. 5 is a flow diagram of a processes executed by the feature extraction module and the student classifier module of FIG. 2 according to one exemplary embodiment.

FIG. 5 is a flow diagram of the processes executed by the feature extraction module 204 and the student classifier module 208 according to one exemplary embodiment. In block 500, the feature extraction module 204 receives the labeled input dataset 212 and selects convolutional layers of the pre-trained convolutional network for achieving the transfer learning. Features of the input dataset are extracted from the selected layers and further processed in block 502 to reduce/compress dimensionality of the data into a smaller number of components. In one embodiment, over 10,000 features are reduced, for example, to 300 components, via a data reduction technique. The data reduction technique may be, for example, principal component analysis (PCA) as is understood by a person of skill in the art. PCA allows the extracted features from a selected convolutional layer to be combined in a specific way, so as to retain the most valuable parts of the variables. Although PCA is used as an example of a data reduction technique, a person of skill in the art should recognize that other data reduction techniques may also be used, such as, for example, linear discriminant analysis. In yet in some embodiments, reduction of dimensionality of the extracted features may be an optional step.

In block 504, the features extracted from the selected layers that have been reduced in dimensionality, are combined and output as the combined components 216 to be used for training the student classifier module 208. In one embodiment, only positive ("good") training data from the combined components 216 are fed to the student classifier module 208 for training the complementary generator 300 and discriminator 306 in block 506.

In block 508, the iterative training of the complementary generator 300 and discriminator 306 allows identification of the decision boundary 310 which separates the positive samples from the complementary samples.

In block 510, the trained discriminator is output to be used as a classifier to predict faulty parts resulting from a manufacturing process.

Figure 6:
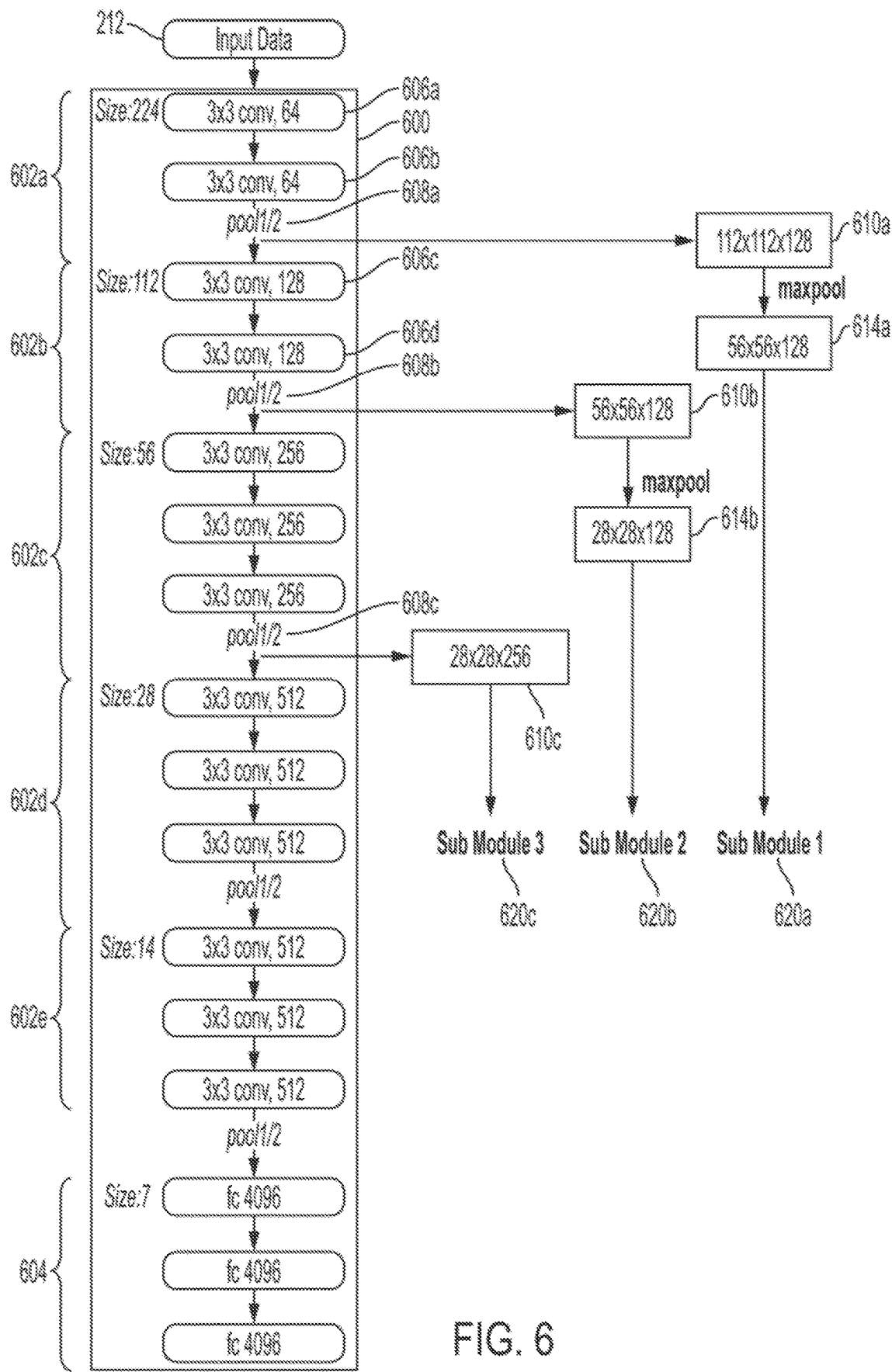
FIG. 6 is a schematic block diagram of features extracted based on selected layers of a pre-trained convolutional network according to one exemplary embodiment.

FIG. 6 is a schematic block diagram of features extracted based on selected layers of a pre-trained convolutional network according to one exemplary embodiment. In one example, the pre-trained convolutional network is a VGG network 600. As will be appreciated by a person of skill in the art, the VGG network 600 is a network that is pre-trained for computer vision tasks such as, for example, classifying objects in images. In general terms, the VGG network 600 consists of various convolutional blocks 602a-602e (collectively referred to as 602) and a fully connected block 604. Each of the convolutional blocks 602 includes a convolutional layer 606a-606c (collectively referred to as 606) and a pooling layer 608a-608c (collectively referred to as 608). Each layer of a convolutional block provides a different level of abstraction of the input data.

The convolutional layers 606 include filters that are applied to their input matrices to obtain convolved outputs, where such outputs represent different features of the input data 212. An exemplary filter may be, for example, a 3×3 matrix of values, where the values are selected to recognize a particular feature in the input matrix via a convolution operation. The filter matrix is "slid" over the input matrix to compute the convolution operation. If the VGG network is used, the convolutional layers (e.g. layers 606a and 606b) are stacked together before applying the pooling layer (e.g. layer 608a). In this case, each layer (e.g. layer 606b) receives its input from the representation of the layer below (e.g. layer 606a).

The pooling layer 608 is configured to down sample an input to create a more abstracted version of the input while still maintaining important elements of the input. In the VGG network, an input matrix to the pooling layer is an output matrix of the prior convolutional layer. In one example, the pooling layer 608 employs a max-pooling filter (e.g. a 2×2 filter) that is "slid" over its input matrix to take a maximum value from each region of the input. The various maximum values from the various regions of the input are then output as values of an output matrix (e.g. matrix 610a, 610b, or 610c). In this manner the values denoting the presence of a feature from the input matrix are kept, while removing unwanted information. The pooling layer thus allows for dimensionality reduction to help decrease computational power to process the data.

In one embodiment, the features extracted from the VGG network are used for transfer learning of the student model by the student model classifier module 208. Although the student model is trained for identification of manufacturing defects, which is generally unrelated to computer vision (for which the VGG network is trained), the VGG network may still be used as a starting point to train the student model.

In one embodiment, two or more layers of the VGG network 600 are selected for extracting features of the input data 212 for the transfer learning. In one embodiment, the layers that are selected are layers that are close to the original input data 212 (also referred to as an input layer) that are configured to capture low-level features (e.g. a low level of abstraction) of the input data, such as, for example, layers no more than ten layers deep from the input layer. The further away the layers are from the input layer, the higher the level of abstraction of the captured features. In one example, the layers that are selected are pooling layers 608a-608c making up layers three, six, and ten of the VGG network 600.

In one embodiment, the selected layers help extract different features related to the input data. For example, one layer may capture features occurring at a high frequency, another layer may capture an amount of correlation between high and low frequency features, while yet a different layer may capture a general pattern of the features.

In one embodiment, the selected pooling layers provide output matrices (also referred to as feature maps) 610a-610c that contain the extracted features of the input data. Dimensionality of some of the extracted feature maps 610a-610b may further be reduced via second filters 612a, 612b that produce further scaled feature maps 614a, 614b. In one embodiment, the second filters 612a, 612b are max-pooling filters similar to the max-pooling filters applied at the pooling layers 608. Although max-pooling is used as an example, a person of skill in the art should recognize that other filters such as min-pooling, average pooling, double/triple max-pooling, or other filters that allows data to be compressed while maintaining the important features, may also be applied.

The extracted feature maps 614a, 614b, and 610c, which may be referred to as sub-modules 620a-620c (collectively referenced as 620), are further processed by the feature extraction module 204 in blocks 502 and 504 (FIG. 5) for being fed to the student classifier module 208.

Figure 7:
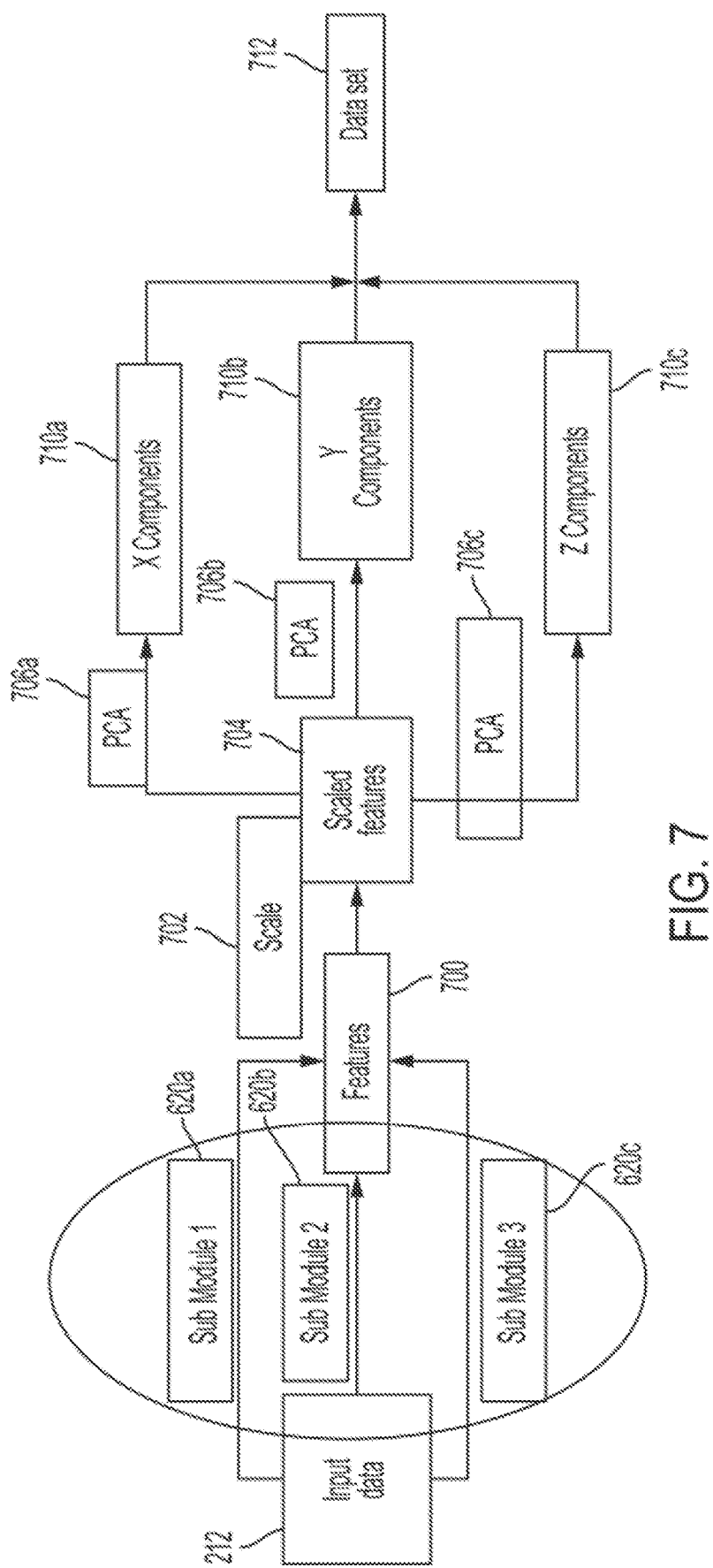
FIG. 7 is a more detailed flow diagram of feature extraction and combination by the feature extraction module of FIG. 2 according to one exemplary embodiment.

FIG. 7 is a more detailed flow diagram of feature extraction and combination by the feature extraction module 204 according to one exemplary embodiment. Features of the input data 212 are extracted at different levels of abstraction for being output as sub-modules 620.

The sub-modules 620 are combined to generate a set of combined features 700. The combined features are further scaled 702 using, for example, a standard scaler, and output as scaled features 704. In one embodiment, the scaling of the features allows the values of the extracted features to conform to a uniform scale. For example, values of one set of extracted features may range from 1-100, while values of another set of extracted features may range from 0-1000. Values for both sets of features are scaled to have, for example, a value of 0-10.

In one embodiment, PCA 706a-706c (collectively referred to as 706), or some other data reduction technique, is applied to each of the scaled sub-modules, and a certain number of components are captured from the extracted and scaled sub-modules. For example, application of PCA 706 results from X number of components 710a being captured from scaled sub-module 1, Y number of components 710b from being captured from scaled sub-module 2, and Z number of components 710c from being captured from scaled sub-module 3.

The captured components are concatenated and output as data set 712. The data set 712 may then be fed to the student classifier module 208 for training the student model as discussed with reference to FIG. 3.

Experiment shows that the classifier that is generated via embodiments of the present disclosure generates a validation accuracy of 90% or higher for both the "good" and the "no good" data.

In some embodiments, one or more of the data preprocessing circuit 110, the classifier engine 115, and the various modules discussed above, is implemented in one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for knowledge distillation for model instances have been specifically described and illustrated herein, many modifications and variations will be apparent to those skilled in the art. Accordingly, it is to be understood that a system and method for knowledge distillation constructed according to principles of this disclosure may be embodied other than as specifically described herein. The disclosure is also defined in the following claims, and equivalents thereof.

What is claimed is:

1. A method for classifying products manufactured via a manufacturing process, the method comprising:
receiving, by a processor, an input dataset;
extracting, by the processor, features of the input dataset at two or more levels of abstraction, wherein the extracting of the features includes invoking a pre-trained neural network and extracting features from selected layers of the pre-trained neural network;
combining, by the processor, the extracted features;
providing, by the processor, the combined extracted features to a classifier;
training, by the processor, the classifier based on the combined extracted features for learning a pattern of not-faulty products, the trained classifier being configured to receive data for a product to be classified, to output a prediction for the product based on the received data.

2. The method of claim 1 further comprising:
reducing, by the processor, dimensionality of the extracted features, wherein the combined extracted features are features of reduced dimensionality.

3. The method of claim 1, wherein the pre-trained neural network is a deep convolutional network having a plurality of convolutional layers, wherein the extracted features are from two or more of the convolutional layers, each of the two or more of the convolutional layers providing a different level of abstraction of the input dataset.

4. The method of claim 3, wherein the two or more of the convolutional layers are no more than ten layers from an input layer.

5. The method of claim 1, wherein the combining of the extracted features includes concatenating the extracted features for generating a combined set of features.

6. The method of claim 1, wherein the classifier is a generative adversarial network that is iteratively trained with not-faulty products for learning a pattern of the not-faulty products.

7. The method of claim 6, wherein the classifier includes a generator and a discriminator, wherein the generator is configured to generate samples of faulty products for training the discriminator from distinguishing between the faulty and not-faulty products.

8. The method of claim 1, wherein the prediction is a prediction of the product as being faulty or not faulty.

9. A system for classifying products manufactured via a manufacturing process, the system comprising:
processor; and
memory, wherein the memory has stored therein instructions that, when executed by the processor, cause the processor to:
receive an input dataset;
extract features of the input dataset at two or more levels of abstraction, wherein the instructions that cause the processor to extract the features further include instructions that cause the processor to invoke a pre-trained neural network and extract features from selected layers of the pre-trained neural network;
combine the extracted features;
provide the combined extracted features to a classifier; and
train the classifier based on the combined extracted features for learning a pattern of only not-faulty products, the trained classifier being configured to receive data for a product to be classified, to output a prediction for the product based on the received data.

10. The system of claim 9, wherein the instructions further cause the processor to:
reduce dimensionality of the extracted features, wherein the combined extracted features are features of reduced dimensionality.

11. The system of claim 9, wherein the pre-trained neural network is a deep convolutional network having a plurality of convolutional layers, wherein the extracted features are from two or more of the convolutional layers, each of the two or more of the convolutional layers providing a different level of abstraction of the input dataset.

12. The system of claim 11, wherein the two or more of the convolutional layers are no more than ten layers from an input layer.

13. The system of claim 9, wherein the instructions that cause the processor to combine the extracted features further include instructions that cause the processor to:
concatenate the extracted features for generating a combined set of features.

14. The system of claim 9, wherein the classifier is a generative adversarial network that is iteratively trained with not-faulty products for learning a pattern of the not-faulty products.

15. The system of claim 14, wherein the classifier includes a generator and a discriminator, wherein the generator is configured to generate samples of faulty products for training the discriminator for distinguishing between the faulty and not-faulty products.

16. The system of claim 9, wherein the prediction is a prediction of the product as being faulty or not faulty.

17. A non-transitory computer-readable medium storing instructions which, when executed by a processor, cause the processor to:
receive an input dataset;
extract features of the input dataset at two or more levels of abstraction, wherein the instructions that cause the processor to extract the features further include instructions that cause the processor to invoke a pre-trained neural network and extract features from selected layers of the pre-trained neural network;
combine the extracted features;
provide the combined extracted features to a classifier;
train the classifier based on the combined extracted features for learning a pattern of not-faulty products, the trained classifier being configured to receive data for a product to be classified, to output a prediction for the product based on the received data.

18. The non-transitory computer-readable medium of claim 17, wherein the instructions cause the processor to reduce dimensionality of the extracted features, wherein the combined extracted features are features of reduced dimensionality.

19. The non-transitory computer-readable medium of claim 17, wherein the pre-trained neural network is a deep convolutional network having a plurality of convolutional layers, wherein the extracted features are from two or more of the convolutional layers, each of the two or more of the convolutional layers providing a different level of abstraction of the input dataset.

20. The non-transitory computer-readable medium of claim 19, wherein the two or more of the convolutional layers are no more than ten layers from an input layer.

* * * * *